Sept. 28, 1965  D. H. SILVERN ETAL  3,208,216
POWER SYSTEM
Filed May 3, 1961 2 Sheets-Sheet 1
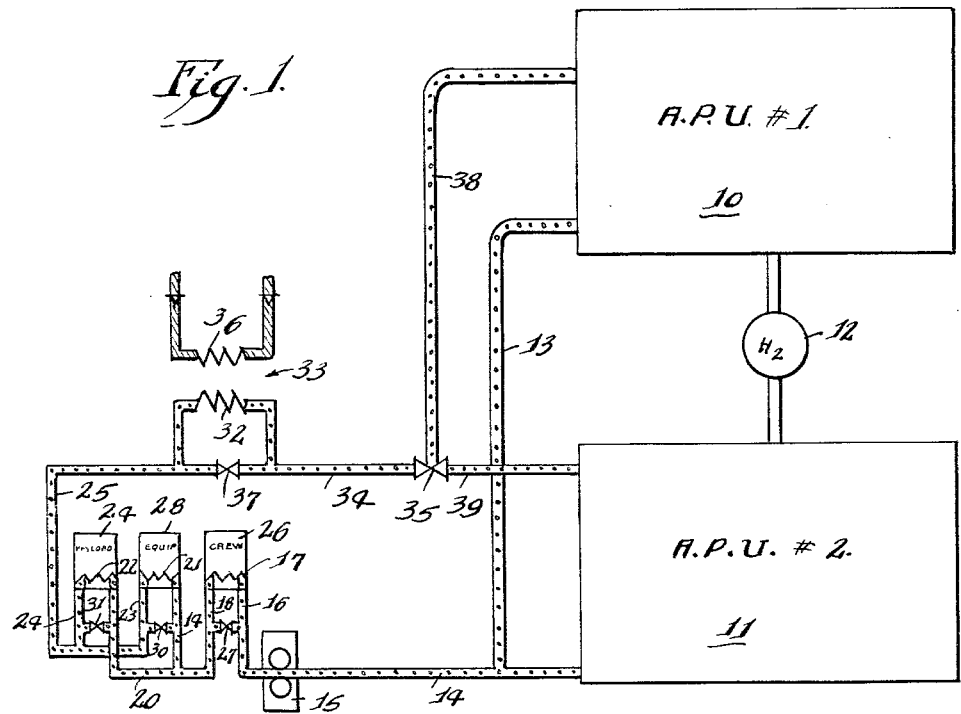
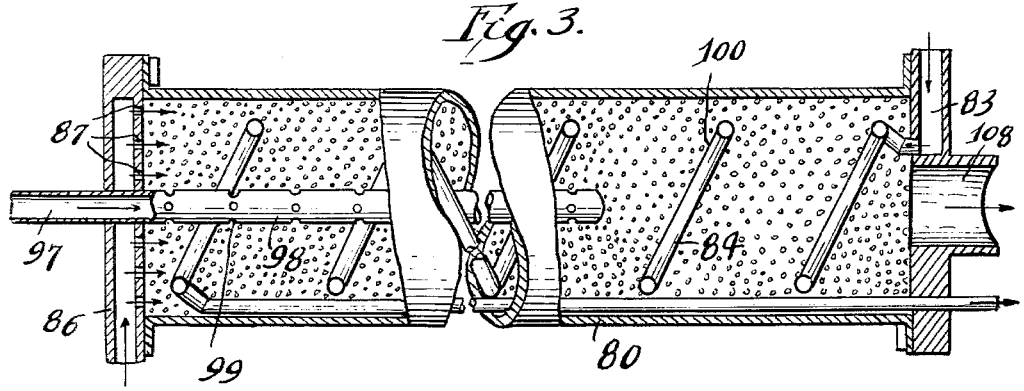
Inventors.
David H. Silvern
John R. May
By Hofgren, Brady,
Wegner, Allen & Stellman
Attorneys.

Sept. 28, 1965     D. H. SILVERN ETAL     3,208,216

POWER SYSTEM

Filed May 3, 1961     2 Sheets-Sheet 2

United States Patent Office 3,208,216
Patented Sept. 28, 1965

3,208,216
POWER SYSTEM
David H. Silvern, North Hollywood, Calif., and John R. May, Denver, Colo., assignors to Sundstrand Corporation, a corporation of Illinois
Filed May 3, 1961, Ser. No. 107,589
9 Claims. (Cl. 60—39.17)

The present invention relates to power systems and more particularly to power systems having a multi-stage expansion engine in which the driving fluid is reheated to a predetermined temperature before entry into each stage of the engine.

The copending application of David H. Silvern and Eugene B. Zwick filed April 3, 1961 as Serial No. 100,334, now abandoned, discloses the utilization of a multi-stage expansion engine wherein the heat from various sources is utilized to heat the driving fluid of the expansion engine to approximately the same temperature before entry into each stage. As the number of stages in such an engine is increased, it more closely approximates an isothermal expansion engine. The sources of heat may be either devices driven by the engine such as alternators and hydraulic pumps and motors or they may be unconnected sources such as skin heating of a high altitude aircraft or a space vehicle. Such systems have a particular usefulness in high altitude and space vehicles in that the exhaust pressure can closely approach absolute zero. Thus a maximum number of stages of a given pressure ratio may be utilized for a given pressure at the driving fluid source.

The copending application discloses multiple secondary fluid systems for transferring heat from various heat sources to combined heat exchangers for raising the temperature of the driving fluid between stages. In some applications it is difficult to obtain a constant temperature of such secondary fluids and also to prevent the transfer of heat from the warmer secondary fluids to the cooler ones in a combined heat exchanger. Further, some heat sources are at a temperature which is too low to be utilized to heat a secondary fluid. Therefore, such heat sources in a given vehicle have not previously been considered as an aid in such a power system.

Therefore, it is an object of the present invention to provide a power system utilizing a multi-stage expansion engine, wherein the temperature of the driving fluid is raised to a predetermined temperature prior to its entry into each stage and wherein the heat from sources which are too cool relative to the temperature of the driving fluid as it is exhausted from each stage is utilized to heat the driving fluid prior to entry into the engine.

Another object is to provide such a power system wherein a single secondary fluid is used to heat the primary or driving fluid of the engine to prevent a loss of heat between the multiplicity of secondary fluids and to simplify the design of heat exchangers for transferring the heat between a secondary fluid and the primary fluid.

A further object is to provide such a power system wherein a secondary fluid is circulated through heat exchangers associated with various heat sources in series and parallel combinations of ascending temperatures and finally through a reaction chamber which heats the secondary fluid to a predetermined temperature prior to entry into the heat exchangers which transfer heat to the primary fluid as it flows between stages.

An additional object is to provide a control system for the reaction chamber of the previous object wherein the reaction chamber provides the correct amount of additional heat to raise the secondary fluid to the predetermined temperature as the various heat sources fluctuate.

A still further object of the present invention is to provide a power system utilizing a multi-stage expansion engine which has its driving fluid raised to a predetermined temperature prior to entry in each stage and has a combined temperature and speed control system that will regulate both the flow of primary fluids into the engine and the addition of heat to both the primary and secondary fluids.

Still another object is to provide a multiplicity of power systems as stated in the previous objectives wherein the secondary fluid flows through the heat exchangers associated with the various heat sources and is then distributed to the various power units in quantities which are proportional to the loads on the various engines.

Further objects and advantages will become apparent from the following detailed description taken in connection with the accompanying drawings, in which:

FIGURE 1 is a schematic diagram of an embodiment of the present invention wherein two power units are utilized;

FIGURE 3 is a cross sectional view of a component shown in FIGURE 2.

Figure 2:
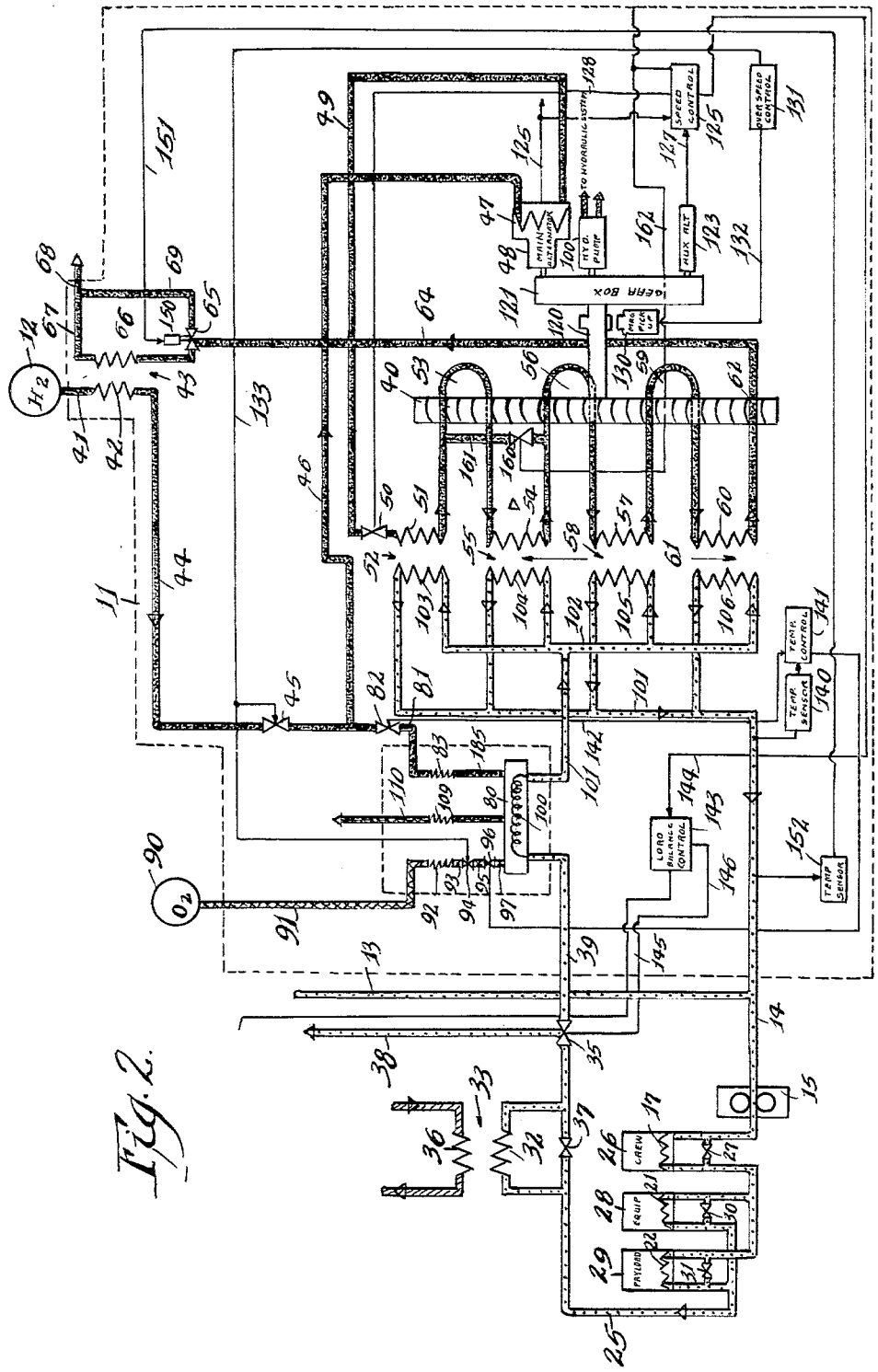
FIGURE 2 is a detailed schematic diagram of a portion of the embodiment of the present invention shown in FIGURE 1.

While this invention is susceptible of embodiments in many different forms, there is shown in the drawings and will herein be described in detail, embodiments of the invention with the understanding that the present disclosure is to be considered as an exemplification of the principle of the invention and is not intended to limit the invention to the embodiment illustrated. The scope of the invention will be pointed out in the appended claims.

Referring first to FIGURE 1, a power system is illustrated which has two power units with a common secondary fluid system. A power unit 10 and a power unit 11 receive hydrogen from a liquid hydrogen tank 12. The liquid hydrogen is vaporized in the tank 12 and is utilized by each of the power units to drive a multi-stage expansion engine as will be described presently. A fluid line 13 conducts a secondary fluid consisting of a mixture of eutectic ethylene glycol from the unit 10 to a fluid line 14. The fluid line 14 conducts fluid from the power unit 11 and the fluid line 13 to a pump 15 which maintains a fluid flow rate of approximately 7 pounds per minute from each of the power units. The pump 15 forces the secondary fluid through a fluid line 16, a heat exchanger 17, a fluid line 18, paralleled lines 19 and 20, paralleled heat exchangers 21 and 22 and paralleled fluid lines 23 and 24 to a fluid line 25. The entire system is installed in a space vehicle. The heat exchanger 17 is installed in the vehicle in such a manner that it transfers heat from crew compartments 26 to the secondary fluid to cool these compartments inhabited by the crew. At any time the crew compartments reach a temperature which is sufficiently low, cooling may be stopped by opening a valve 27 connected between the fluid lines 16 and 18 that causes the secondary fluid to bypass the heat exchanger 17. Under normal operation conditions the secondary fluid would leave the power units at a temperature of approximately 25° F. and would be raised to a temperature of approximately 45° F. while cooling the crew compartments. In most space vehicles, compartments which contain merely equipment or payload can remain at a temperature which is higher than the temperature desirable for the crew. The heat exchanger 21 is installed to cool an equipment compartment 28 and the heat exchanger 22 is installed to remove heat from a payload compartment 29. Since the quantity of heat being received from these compartments from both internal and external sources is approximately equal per unit volume and it is desired to cool them to approximately the same temperature which is higher than that required for the crew compartments, the heat exchangers 21 and 22 are connected in parallel rather than in series.

As the secondary fluid flows through these heat exchangers its temperature rises to approximately 140° F. When the equipment compartment reaches a sufficiently low temperature, a valve 30 which is connected between the fluid lines 19 and 23 may be opened to allow the fluid to bypass the heat exchanger 21. In a similar manner, a valve 31 which is connected between the fluid lines 20 and 24 may be opened to allow the secondary fluid to bypass the heat exchanger 22.

The fluid line 25 is connected to a low temperature portion 32 of a heat exchanger 33. A fluid flow line 34 conducts the fluid from the heat exchanger 33 to a valve 35. Hydraulic oil from the hydraulic system (not shown) is circulated through the high temperature portion 36 of the heat exchanger 33. Since the hydraulic oil is a temperature substantially in excess of 200° F. heat is transferred in the heat exchanger 33 from the hydraulic fluid raising its temperature to approximately 190° F. A bypass valve 37 is connected between the fluid lines 25 and 34 and may be opened to prevent further cooling of a hydraulic fluid as required by the hydraulic oil system. The valve 35 provides the flow of secondary fluid between a fluid line 38 and a fluid line 39 in response to signals received from a load balanced control system which will subsequently be described. The line 38 conducts fluids to power unit 10 and the line 39 conducts fluid to the power unit 11.

Referring now to FIGURE 2, the power unit 11 will be described in detail. The power unit 10 is identical in construction except as noted in the following description. The components associated with the secondary fluid system previously described are shown in FIGURE 2.

The tank 12 contains gaseous hydrogen at a pressure of approximately 325 p.s.i.a. at a temperature of −423° F. to −314° F. In order to commence warming the hydrogen for use as the driving fluid of a multi-stage gas turbine generally indicated at 40, hydrogen flows through a line 41 to a low temperature portion 42 of a heat exchanger 43. The heat exchanger 43 increases the temperature of the hydrogen to approximately −65° F. before it flows through a fluid line 44, a valve 45 and a fluid line 46 to a heat exchanger 47 which absorbs heat from a main alternator 48. The heat exchanger 47 raises the temperature of the hydrogen to approximately +9° F. before it flows through a fluid line 49 and through a valve 50 into a low temperature portion 51 of a heat exchanger 52. The hydrogen is raised to a temperature of approximately 160° F. in the heat exchanger 52 and then flows through the nozzles and turbine blades generally indicated at 53 which comprise a first stage of the turbine 40. From the first stage the hydrogen flows through a low temperature portion 54 of a heat exchanger 55 wherein the temperature of the hydrogen which has dropped to approximately a −12° F. in the first stage is again raised to approximately 160° F. The hydrogen then flows from the heat exchanger 55 through the nozzles and turbine blades of a second stage generally indicated at 56 where its temperature is again reduced to approximately −12° F. The hydrogen flows from the second stage through a low temperature portion 57 of a heat exchanger 58 which raises its temperature again to approximately 160° F. The hydrogen flows through the nozzles and turbine blades of a third stage generally indicated at 59 to a low temperature portion 60 of a heat exchanger 61 where the process of reducing the temperature to approximately −12° and reheating it to a temperature of approximately 160° is again repeated. From the heat exchanger 61, the hydrogen flows through a fourth and final stage generally indicated at 62 wherein the temperature of the hydrogen decreases once more to approximately −12° F. A fluid line 64 conducts the hydrogen from the fourth stage through a valve 65 to a high temperature portion 66 of the heat exchanger 43. Thus, the hydrogen which has been exhausted from the turbine 40 is utilized to initially heat the hydrogen as it flows from the tank 12. The hydrogen which has been reduced from a temperature of approximately −300° F. flows from the high temperature portion 66 through a line 67 to an exhaust point indicated at 68. A bypass line 69 is connected between the valve 65 and the exhaust point 68. The valve 65 may divert the hydrogen flow from the heat exchanger 43 to the bypass line 69 whenever it receives an appropriate signal from a control system to be described.

Referring now to both FIGURES 2 and 3, a combustion chamber 80 receives hydrogen through a fluid line 81 and a valve 82 which is connected to the line 46. Hydrogen flows from a line 81 through a low temperature portion 83 of a heat exchanger 84 which raises its temperature from −65° F. to 140° F. A fluid line 85 conducts the hydrogen from the heat exchanger 84 to an inlet passage 86 of the reaction chamber 80. The chamber 80 is filled with palladium-alumina catalyst pellets. Hydrogen flows from the passage 86 through a set of apertures 87 into the voids between the pellets throughout the chamber 80. Liquid oxygen is stored in a tank 90. The liquid oxygen vaporizes within the tank and vaporized oxygen flows from the tank through a fluid line 91 to another low temperature portion 92 of the heat exchanger 84 which raises its temperature from approximately −230° F. to 140° F. The oxygen flows from the heat exchanger 84 through a fluid line 93, a valve 94, a line 95, a valve 96 and a line 97 to an oxygen distribution probe 98 which is located through the center of the chamber 80. The oxygen is injected into hydrogen through a multiplicity of small apertures 99 through the wall of the probe 98 for the purpose of having combustion occur over a substantially large volume of the chamber 80. Thus the peak temperatures occurring at the exact point of combustion between the oxygen and the hydrogen is spread over a much greater volume and dilution occurs either by yet unreacted hydrogen or by steam which has been formed by previous combustion thus keeping the temperature to moderate values. A spiral coil 100 surrounds the volume through which the peak temperatures are distributed. The line 39 is connected to the coil 100 in order to raise the temperature of the secondary fluid to approximately 205° F. whenever that temperature has not been obtained from the heat sources previously described as the secondary fluid flows into the power unit through the line 39. If this temperature has been obtained, the combustion chamber will be turned off by the control means to be subsequently described. A fluid line 101 conducts the secondary fluid from the coil 100 to a manifold 102 which provides parallel connections to high temperature portions 103, 104, 105 and 106 of the heat exchangers 52, 55, 58 and 61 respectively. An exhaust manifold 107 conducts the secondary fluid from these heat exchangers to the line 14 previously described.

Water vapor resulting from the combustion is conducted from the chamber 80 through an outlet passage 108 to a high temperature portion 109 of the heat exchanger 84. A line 110 conducts the steam to a location outside the power unit. There, it can be either exhausted overboard or preserved in a condensed state for drinking water during extended missions.

Referring to FIGURE 2, the turbine 40 has a drive shaft 120 which is connected to a gearbox 121. The main alternator 48, a hydraulic pump 122 and an auxiliary alternator 123 are connected to the gearbox 121 to be driven therefrom. The main alternator 48 supplies electrical power to the space vehicle's power system (not shown) through an electrical line 124. A small portion of the A.C. current from the alternator is conducted to a speed control device 125 through an electrical line 126. If the main alternator should fail for any reason, an alternating current signal indicative of the speed of the turbine is received by the control device 125 from the auxiliary alternator 123 through an electrical line 127.

The design of the speed control device 125 is not in itself a portion of the present invention. Any suitable speed control device which can detect the speed of the turbine from the frequency from either the main alternator or the auxiliary alternator and produce output signals which are proportional to the speed of the turbine may be utilized. Such a signal is transmitted through the electrical line 128 to control the valve 52. As the speed of the engine increases beyond a desired value, the speed control 125 sends a signal to the valve 50 to reduce the rate of flow of the hydrogen into the turbine. Thus the turbine will decrease in speed. As the turbine slows down below a predetermined speed, the control 125 will send a signal to the valve which will cause it to increase the flow rate and thereby increase the speed of the turbine.

For reliability and safety, an overspeed control system is provided. It consists of a magnetic pickup 130 mounted in conjunction with the shaft 120 which produces a signal which is transmitted to an overspeed control device 131 by an electrical line 132. The design of the overspeed device 131 is not in itself a part of the present invention and it may be one of the many types of devices well known in the art. It produces a control signal in an electrical line 133 which actuates the valves 45 and 96 to their closed positions whenever the speed of the shaft reaches a predetermined value.

When the valve 96 is closed, no oxygen will reach the combustion chamber 70 and therefore the chamber will be turned off. When the valve 45 is closed, hydrogen will not reach either the combustion chamber or the turbine. Thus the turbine will stop for lack of a driving fluid and the combustion in the chamber will stop for lack of both oxygen and hydrogen.

In addition to the speed control device just described, temperature control is also provided. A temperature sensing device 140 measures the temperature of the secondary fluid at a point in the line 14. The temperature sensing device is connected to a temperature control device 141. When the temperature sensor 140 detects an increase of temperature above a predetermined value, the temperature control sends a signal through an electrical line 142 to the valve 82 to reduce the quantity of hydrogen flowing through the combustion chamber 80. In like manner, if the temperature sensor detects that the temperature of the secondary fluid has fallen below another predetermined temperature, the temperature control 141 sends a signal to the valve 82 to increase the flow of hydrogen to the combustion chamber. Thus, the temperature of the secondary fluid, as it flows into the heat exchangers which preheat the hydrogen before it enters each stage of the turbine, is maintained at approximately 205° F. The temperature control device 121 also sends signals proportional to the temperature of the secondary fluid to a load balance control device 143 through an electrical line 144. Since the temperature of the secondary fluid leaving the heat exchangers associated with the turbine rises whenever the load on the turbine is increased the temperature of the secondary fluid is indicative of the load on the turbine. The power unit 10 sends a similar signal through an electrical line 145 to the load balance control device 143. This device compares the two incoming signals and produces a third signal which is transmitted by an electrical line 146 to the valve 35. The signal positions the valve 35 so that the power unit having the greater loads on its turbine receives a proportionally larger quantity of secondary fluid. Therefore the speeds of the turbines in the power units are not only kept within a desirable range of speed by speed control systems but they are also synchronized by means of a temperature sensing load balance control system. Since the load balance device 143 is contained in the power unit 11 it is not necessary for the power unit 10 to contain this element and its associated wiring.

If the temperature of the secondary fluid rises to a sufficiently high value that the valve 82 has completely shut down the reaction chamber, the valve 65 may be actuated by an actuator 150 when it receives a control signal by the movement of a cable 151. Cable 151 is moved by temperature sensing device 152 which is connected to the line 14 whenever the temperature of the secondary fluid in the line 14 exceeds a predetermined value. Actuation of the valve 65 shifts the flow of hydrogen from the heat exchangers 43 through the bypass line 69 to the exhaust point 68. Except for emergency conditions the valve 65 will not shift the flow to the bypass line except when the vehicle is receiving a large quantity of external heat such as is produced by skin friction when the vehicle is re-entering the earth's atmosphere. Under these conditions, a sharp rise in the temperatures of the crew, equipment and payload compartments and the hydraulic system would be experienced. In order to maintain sufficient cooling for these compartments and hydraulic systems the temperature of the hydrogen passing through the heat exchangers 52, 55, 58 and 61 is greatly reduced by having the exhaust hydrogen bypass the heat exchanger 43 and the necessary additional cooling is provided for such a period of time as the excess heat is available with no sacrifice of electrical and hydraulic output.

In order to maintain the turbine 40 at its designed speed without the usual overall pressure ratio being available or because of extreme overloads, a signal is transmitted from the speed control device 125 to a valve 160 in a bypass line 161 around the first stage through an electrical wiring 162. The signal causes the valve 160, which is normally closed, to open and allow the hydrogen turbine entry pressure which is slightly less than 300 p.s.i.a. to be applied directly to the second stage, whose nozzle area is about four and one-half times that of the first stage. This will increase the turbine at a sacrifice of the low specific flow rate which is maintained when all four stages are in operation. Once the speed of the turbine 40 has again reached its designed speed, the control device 125 will transmit a signal to the valve 160 which will close it and bring the first stage back into operation.

It will be understood by those skilled in the art that the present invention may be utilized in many environments other than space vehicles.

We claim:

1. The combination of a first power unit consisting of a first multi-stage expansion engine, a primary fluid driving said first engine, a secondary fluid and means for transferring heat from said secondary fluid to said primary fluid prior to the entry of said primary fluid into the stages of said first multistage engine; a second power unit consisting of a second multi-stage expansion engine, a primary fluid driving said second engine, and means for transferring heat from only said secondary fluid to said primary fluid prior to the entry of said primary fluid into the stages of said second multi-stage engine; at least one heat source; means for transferring heat from said at least one heat source to said secondary fluid; fluid lines for conducting said secondary fluid from said heat transfer means in said first and second power units through said at least one heat source and back to said means; and valve means connected in said fluid lines for controlling the proportional amounts of said secondary fluid flowing from said at least one heat source to said heat transfer means in said units whereby the engine speeds are maintained essentially equal.

2. The combination of a multiplicity of power units each consisting of a multi-stage expansion engine having a load, a primary fluid driving said engine, a secondary fluid and means for transferring heat from said secondary fluid to said primary fluid prior to the entry of said primary fluid into the stages of said multi-stage engine; at least one heat source; means for transferring heat from said one heat source to said secondary fluid, fluid line means for conducting said secondary fluid from said heat transfer means in said power units through said at least one heat source and back to said means; valve means connected in said fluid lines for controlling the proportional amounts of said secondary fluid flowing from said at least one heat source to said heat transfer means in said units whereby the engine speeds are maintained essentially equal; sensing means connected to each power unit for determining the load on its engine and a load balance control connected to said sensing means and to said valve means to compare the loads and to control said valve means to divert a quantity of said secondary fluid to each said unit in proportion to the load on its engine.

3. The combination of an engine system comprising a multi-stage expansion engine, a primary fluid driving said engine, a first set of heat exchangers having a low and a high temperature portion and a first series of fluid lines connecting said aforementioned elements to serially conduct said primary fluid alternately through the low temperature portion of the individual heat exchangers of said set and the stages of said engine; a secondary fluid system comprising a secondary fluid, a reaction chamber, a second set of heat exchangers receiving heat from a multiplicity of heat sources, and a second series of fluid lines connecting the aforementioned elements of said secondary fluid system to serially conduct said secondary fluid through said reaction chamber, the high temperature portion of said first set of heat exchangers connected in parallel, and the low temperature portions of said second set of heat exchangers connected in series and parallel combinations; and a temperature sensing means connected to said secondary fluid having an output signal means connected to said reaction chamber for controlling the operation of said chamber in accordance with the temperature of said secondary fluid at a designated point.

4. The combination of an engine system comprising a multi-stage expansion engine, a primary fluid driving said engine, a heat exchanger, a first set of heat exchangers having a low and a high temperature portion, a valve, and an exhaust point, a first series of fluid lines connecting said aforementioned elements to serially conduct said primary fluid from said storage means through the low temperature portion of said heat exchanger, alternately through the low temperature portion of the individual heat exchangers of said set and the stages of said engine, said valve, the high temperature portion of said first heat exchanger and to said exhaust point, and a bypass line connected between said valve and said exhaust point; a secondary fluid system comprising a secondary fluid, a second set of heat exchangers receiving heat from a multiplicity of heat sources, and a second series of fluid lines connecting the said second set to serially conduct said secondary fluid through the high temperature portion of said first set of heat exchangers connected in parallel, and the low temperature portions of said second set of heat exchangers connected in series and parallel combinations; and a temperature sensing means connected to said second series of fluid lines having an output signal means connected to said valve for diverting said primary fluid from said first heat exchanger to said bypass line whenever the secondary fluid temperature at a designated point exceeds a predetermined value.

5. The combination of an engine system comprising a multi-stage expansion engine, a primary fluid driving said engine, a heat exchanger, a first set of heat exchangers having a low and a high temperature portion, a valve, and an exhaust point, a first series of fluid lines connecting said aforementioned elements to serially conduct said primary fluid from said storage means through the low temperature portion of said heat exchanger, alternately through the low temperature portion of the individual heat exchangers of said set and the stages of said engine, said valve, the high temperature portion of said first heat exchanger and to said exhaust point, and a bypass line connected between said valve and said exhaust point; a secondary fluid system comprising a secondary fluid, a reaction chamber, a second set of heat exchangers receiving heat from a multiplicity of heat sources, and a second series of fluid lines connecting the aforementioned elements of said secondary fluid system to serially conduct said secondary fluid through said reaction chamber, the high temperature portion of said first set of heat exchangers connected in parallel, and the low temperature portions of said second set of heat exchangers connected in series and parallel combinations; and a control system consisting of a first temperature sensing means connected to said second series of fluid lines having an output signal means connected to said fourth valve for diverting said primary fluid from said first heat exchanger to said bypass line whenever the secondary fluid temperature at a designated point exceeds a predetermined value, and a second temperature sensing means connected to said secondary fluid having an output signal means connected to said reaction chamber for controlling the operation of said chamber in accordance with the temperature of said secondary fluid at a designated point.

6. The combination of an engine system comprising a multi-stage expansion engine, a primary fluid driving said engine, a valve, a first set of heat exchangers having low and high temperature portions and a first series of fluid lines connnecting said aforementioned elements to serially conduct said primary fluid through said valve, alternately through the low temperature portion of the individual heat exchangers of said set and the stages of said engine; a secondary system comprising a secondary fluid, a reaction chamber, a second set of heat exchangers receiving heat from a multiplicity of heat sources, a second series of fluid lines connecting the aforementioned elements of said secondary fluid system to serially conduct said secondary fluid through said reaction chamber, the high temperature portion of said first set of heat exchangers connected in parallel, and the low temperature portions of said second set of heat exchangers connected in series and parallel combinations; a power system connected to be driven by said engine including an alternator connected to said second heat exchanger and connected to be driven by said engine; and a speed control device connected to a means for sensing the speed of said engine and connected to said valve for controlling the flow of primary fluid to said engine and to said reaction chamber for controlling the operation of said reaction chamber.

7. The combination of an engine system comprising a multi-stage expansion engine, a primary fluid driving said engine, a first valve, a second valve, a bypass fluid line connected around the first stage of said multi-stage engine having said second valve inserted therein, a first set of heat exchangers having low and high temperature portions, and a first series of fluid lines connecting said aforementioned elements to serially conduct said primary fluid through said first valve, alternately through the low temperature portion of the individual heat exchangers of said set and the stages of said engine; a secondary fluid system comprising a secondary fluid, a reaction chamber, a second set of heat exchangers receiving heat from a multiplicity of heat sources, a second series of fluid lines connecting the aforementioned elements of said secondary fluid system to serially conduct said secondary fluid through said reaction chamber, the high temperature portion of said first set of heat exchangers connected in parallel and the low temperature portions of said second set of heat exchangers connected in series and parallel combinations; a power system connected to be driven by said engine including an alternator connected to said second heat exchanger and connected to be driven by said engine; and a speed control device connected to said alternator to sense the speed of said engine, connected to said first valve to control the rate of primary fluid flow into said engine and connected to said second valve to bypass said primary fluid around the first stage of said engine.

8. The combination of an engine system comprising a multi-stage expansion engine, a primary fluid driving said engine, a first valve, a second valve, a first set of heat exchangers having low and high temperature portions, a third valve, a bypass fluid line connected around the first stage of said multi-stage engine having said third valve inserted therein, and a first series of fluid lines connecting said aforementioned elements to serially conduct said primary fluid through said first valve, said second valve alternately through the low temperature portion of the individual heat exchangers of said set and the stages of said engine; a secondary fluid system comprising a secondary fluid, a reaction chamber, a second set of heat exchangers receiving heat from a multiplicity of heat sources, a second series of fluid lines connecting the aforementioned elements of said secondary fluid system to serially conduct said secondary fluid through said reaction chamber, the high temperature portion of said first set of heat exchangers connected in parallel, and the low temperature portions of said second set of heat exchangers connected in series and parallel combinations; a power system connected to be driven by said engine including a main alternator connected to said second heat exchanger and connected to be driven by said engine, an auxiliary alternator connected to be driven by said engine; and a control system comprising a speed control device connected to said main alternator and said auxiliary alternator to sense the speed of said engine, connected to said second valve to control the rate of primary fluid flow into said engine and connected to said third valve to bypass said primary fluid around the first stage of said engine, and an overspeed control connected to a means for sensing the speed of said shaft and connected to said first valve for controlling the flow of primary fluid to said engine and to said reaction chamber for controlling the operation of said reaction chamber.

9. The combination of an engine system comprising a multi-stage expansion engine, a primary fluid driving said engine, means for storing said primary fluid, a first heat exchanger having a low and a high temperature portion, a first valve, a second heat exchanger having a low and a high temperature portion, a second valve, a third heat exchanger having a low and a high temperature portion, a first set of heat exchangers having low and high temperature portions, a third valve, a bypass fluid line connected around the first stage of said multi-stage engine having said third valve inserted therein, a fourth valve, an exhaust point, a first series of fluid lines connecting said aforementioned elements to serially conduct said primary fluid from said storage means through the low temperature portion of said first heat exchanger, said first valve, the low temperature portion of said second heat exchanger, said second valve, the low temperature portion of said third heat exchanger, alternately through the stages of said engine and the low temperature portion of the individual heat exchangers of said set, said fourth valve, the high temperature portion of said first heat exchanger and to said exhaust point, and a bypass line connected between said fourth valve and said exhaust point; a secondary fluid system comprising a secondary fluid, a reaction chamber, a pump, a second set of heat exchangers receiving heat from a multiplicity of heat sources, and a second series of fluid lines connecting the aforementioned elements of said secondary fluid system to serially conduct said secondary fluid through said reaction chamber, the high temperature portion of said first set of heat exchangers connected in parallel, said pump and the low temperature portions of said second set of heat exchangers connected in series and parallel combinations; a power system conected to be driven by said engine consisting of a gearbox, a shaft connected between said engine and said gearbox for drivnig said gearbox by said engine, a main alternator connected to the high temperature portion of said second heat exchanger and connected to be driven by said gearbox, an auxiliary alternator connected to be driven by said gearbox, a hydraulic pump; and a control system consisting of a first temperature sensing means connected to said second series of fluid lines having an output signal means connected to said fourth valve for diverting said primary fluid from the high temperature portion of said first heat exchanger to said bypass line whenever the secondary fluid temperature as it flows from the high temperature portion of said first set of heat exchangers exceeds a predetermined value, a second temperature sensing means connected to said secondary fluid line having an output signal means connected to said reaction chamber for controlling the operation of said chamber in accordance with the temperature of said secondary fluid as it flows from the high temperature portion of said first set of heat exchangers, a main speed control device connected to said main alternator and said auxiliary alternator to sense the speed of said shaft, connected to said second valve to control the rate of primary fluid flow into said engine and connected to said third valve to bypass said primary fluid around the first stage of said engine, and an overspeed control device connected to a means for sensing the speed of said shaft and connected to said first valve for controlling the flow of primary fluid to said engine and to said reaction chamber for controlling the operation of said reaction chamber.

References Cited by the Examiner

UNITED STATES PATENTS

| | | | |
|---|---|---|---|
| 2,218,604 | 10/40 | Dill | 23—188 |
| 2,267,768 | 12/41 | Tobiasson | 23—188 |
| 2,268,270 | 12/41 | Travpel | 60—39,17 |
| 2,584,232 | 2/52 | Sedille | 60—39.17 |
| 2,917,903 | 12/59 | Stineman | 60—39.66 |
| 2,919,551 | 1/60 | Campbell | 60—73 |

FOREIGN PATENTS

| | | |
|---|---|---|
| 213,606 | 9/57 | Australia. |
| 505,044 | 8/54 | Canada |
| 360,632 | 3/06 | France |

OTHER REFERENCES

Howard: "Generation of Electric Power in Space Vehicles by Means of a Cryogenic Fuel Powered Engine." A paper presented at the Air Transportation Conference of the Summer and Pacific General Meeting of the A.I.E.E., Seattle, Washington, June 24-26, 1959, Paper No. 59-982 (1 cover sheet, 9 pgs. spec., 6 shts. drawg.). (Note in particular FIGURE 8.)

SAMUEL LEVINE, *Primary Examiner.*